United States Patent
Poggio

(10) Patent No.: US 11,923,553 B2
(45) Date of Patent: Mar. 5, 2024

(54) POWER STORAGE SYSTEM FOR A VEHICLE PROVIDED WITH AT LEAST ONE ELECTRIC MOTOR

(71) Applicant: FERRARI S.p.A., Modena (IT)

(72) Inventor: Luca Poggio, Modena (IT)

(73) Assignee: FERRARI S.p.A., Modena (IT)

( * ) Notice: Subject to any disclaimer, the term of this patent is extended or adjusted under 35 U.S.C. 154(b) by 119 days.

(21) Appl. No.: 17/519,703

(22) Filed: Nov. 5, 2021

(65) Prior Publication Data

US 2022/0149467 A1 May 12, 2022

(30) Foreign Application Priority Data

Nov. 6, 2020 (IT) .................. 102020000026545

(51) Int. Cl.
*H01M 50/20* (2021.01)
*B60L 50/64* (2019.01)
*H01M 50/502* (2021.01)

(52) U.S. Cl.
CPC ............. *H01M 50/20* (2021.01); *B60L 50/64* (2019.02); *H01M 50/502* (2021.01); *H01M 2220/20* (2013.01)

(58) Field of Classification Search
CPC ............... H01M 50/20; H01M 50/502; H01M 2220/20; B60L 50/64
See application file for complete search history.

(56) References Cited

U.S. PATENT DOCUMENTS 10,611,234 B1 * 4/2020 Berels ................. H01M 10/656
2010/0187027 A1 7/2010 Komaki 2018/0114961 A1 4/2018 Kim et al.
2018/0337377 A1 * 11/2018 Stephens ............. H01M 50/224
2022/0118838 A1 * 4/2022 Jung .................. H01M 50/204

FOREIGN PATENT DOCUMENTS

| CN | 106935747 A | | 7/2017 |
| KR | 20210128814 A | * | 10/2021 |
| KR | 20210128814 A | * | 10/2021 |

OTHER PUBLICATIONS

Italian Search Report and Written Opinion for Application No. 102020000026545, completed Jun. 25, 2021, 8 pages.

* cited by examiner

*Primary Examiner* — John D Walters
*Assistant Examiner* — Nicholas R. Kandas
(74) *Attorney, Agent, or Firm* — CANTOR COLBURN LLP

(57) ABSTRACT

A power storage system for a vehicle provided with at least one electric motor. The power storage system has: a container provided with a lower wall; and a plurality of modules, which are housed inside the container and directly rest on the lower wall. Each module has a group of electrochemical cells and two containing walls which are perpendicular to the lower wall of the container and are arranged parallel to one another on opposite sides of the pack of electrochemical cells so as to clamp the pack of electrochemical cells between them. Each containing wall has at least one tubular connection body and a plurality of locking elements are provided, which are fixed to the lower wall, project perpendicularly from the lower wall, and engage the connection bodies.

24 Claims, 7 Drawing Sheets

POWER STORAGE SYSTEM FOR A VEHICLE PROVIDED WITH AT LEAST ONE ELECTRIC MOTOR

CROSS-REFERENCE TO RELATED APPLICATIONS

This Patent application claims priority from Italian Patent Application No. 102020000026545 filed on Nov. 6, 2020, the entire disclosure of which is incorporated herein by reference.

TECHNICAL FIELD

The present invention relates to a power storage system for a vehicle provided with at least one electric motor.

PRIOR ART

A vehicle can be provided with only one or several electric motors (and in this case the drive is exclusively electric) or can be provided with one or several electric motors in combination with a thermal motor (and in this case the drive can be exclusively electric, exclusively thermal or also hybrid).

The electric motor (or each electric motor) is mechanically connected to the driving wheels and is electrically connected to a power storage system by means of the interposition of an electronic power converter.

The power storage system is composed of groups of electrochemical cells (generally having a pouch structure or a prismatic structure) connected to one another in series (so as to increase the overall electric voltage); the groups of electrochemical cells are generally connected to one another in parallel (so as to increase the intensity of the overall electric current). The power storage system can have very large dimensions and very heavy weights (particularly in the case of an exclusively electric drive in which the power storage system can also weigh more than 500 kg).

In the more modern vehicles, the power storage system has a flat and (relatively) thin shape so as to be integrated inside the floor. In this arrangement, the power storage system comprises a container having a lower wall (which constitutes the bottom of the vehicle facing the road surface), an upper wall and a side wall which is perpendicular to the lower and upper walls and connects the lower and upper walls to one another. Inside the container, the various groups of electrochemical cells are arranged, each forming a corresponding module.

With this arrangement, the power storage system becomes integral part of the floor of the vehicle and is thus designed to contribute to conferring resistance and rigidity to the floor. In order to increase the mechanical performance of the power storage system, it is known to arrange inside the container a series of struts arranged longitudinally and of crosspieces arranged transversally so as to create an alveolar structure having a series of alveoli each adapted to contain a corresponding module (i.e. a corresponding group of cells). However, the presence of struts and crosspieces entails a substantial increase in weight and also a greater bulk.

Patent application N. US2018114961A1 describes a power storage system for a vehicle and comprising a plurality of battery modules arranged adjacent to one another and mounted on a base plate; in order to couple the battery modules to the base plate, each battery module is provided with tubular connection bodies and cables in which respective bolts are inserted which screw in threaded holes obtained in the base plate.

DESCRIPTION OF THE INVENTION

The object of the present invention is to provide a power storage system for a vehicle provided with at least one electric motor, said power storage system having a reduced weight and simultaneously being easy and cost-effective to manufacture.

According to the present invention, a power storage system for a vehicle provided with at least one electric motor is manufactured, according to what claimed in the appended claims.

The claims describe preferred embodiments of the present invention forming integral part of the present description.

BRIEF DESCRIPTION OF THE DRAWINGS

The present invention will now be described with reference to the accompanying drawings, which illustrate a non-limiting example embodiment thereof, wherein.

PREFERRED EMBODIMENTS OF THE INVENTION

Figure 1:
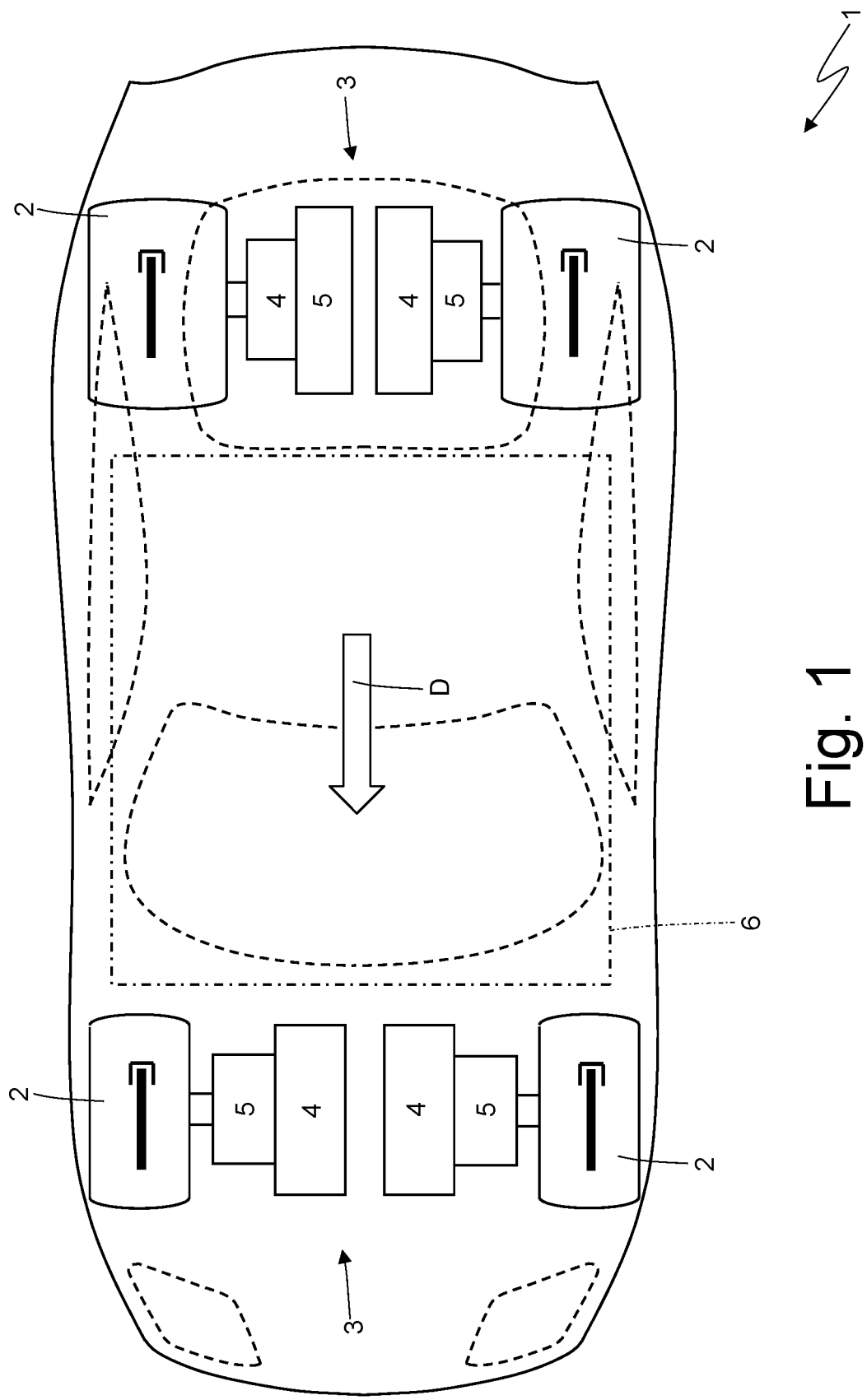
FIG. 1 is a schematic plan view of an electrically propelled road vehicle provided with a power storage system made in accordance with the present invention.

In FIG. 1, reference numeral 1 indicates, as a whole, an electrically propelled vehicle provided with four driving wheels 2 (two front driving wheels 2 and two rear driving wheels 2).

The vehicle 1 comprises an electric powertrain system 3 arranged in front position (i.e. is connected to the two front driving wheels 2) and an electric powertrain system 3 which is arranged in rear position (i.e. is connected to the two rear driving wheels 2), is structurally totally identical to the electric powertrain system 3 arranged in front position, and is mechanically totally independent of and separate from the electric powertrain system 3 arranged in front position.

According to a different embodiment not illustrated, the vehicle 1 comprises a single electric powertrain system 3 (arranged in front position or arranged in rear position) and thus has only two driving wheels 2; in this embodiment, the vehicle 1 could also comprise a thermal powertrain system connected to the driving wheels 2 that do not receive the motion from the electric powertrain system 3.

Each electric powertrain system 3 comprises a pair of reversible electric machines 4 (i.e. which can operate both as electric motor absorbing electric energy and generating a driving mechanical torque, and as electric generator absorbing mechanical energy and generating electric energy) provided with respective shafts and a pair of transmissions 5 which connect the electric machines 4 (i.e. shafts of the electric machines 4) to the corresponding driving wheels 2 without the interposition of any clutch.

Each electric machine 4 is driven by a corresponding AC/DC electronic power converter (i.e. an inverter) which is connected to a power storage system 6 provided with chemical batteries; i.e. each DC-AC electronic power converter is bidirectional and comprises a side in direct current connected to the power storage system 6 and a side in three-phase alternating current which is connected to the corresponding electric machine 4.

Figure 2:
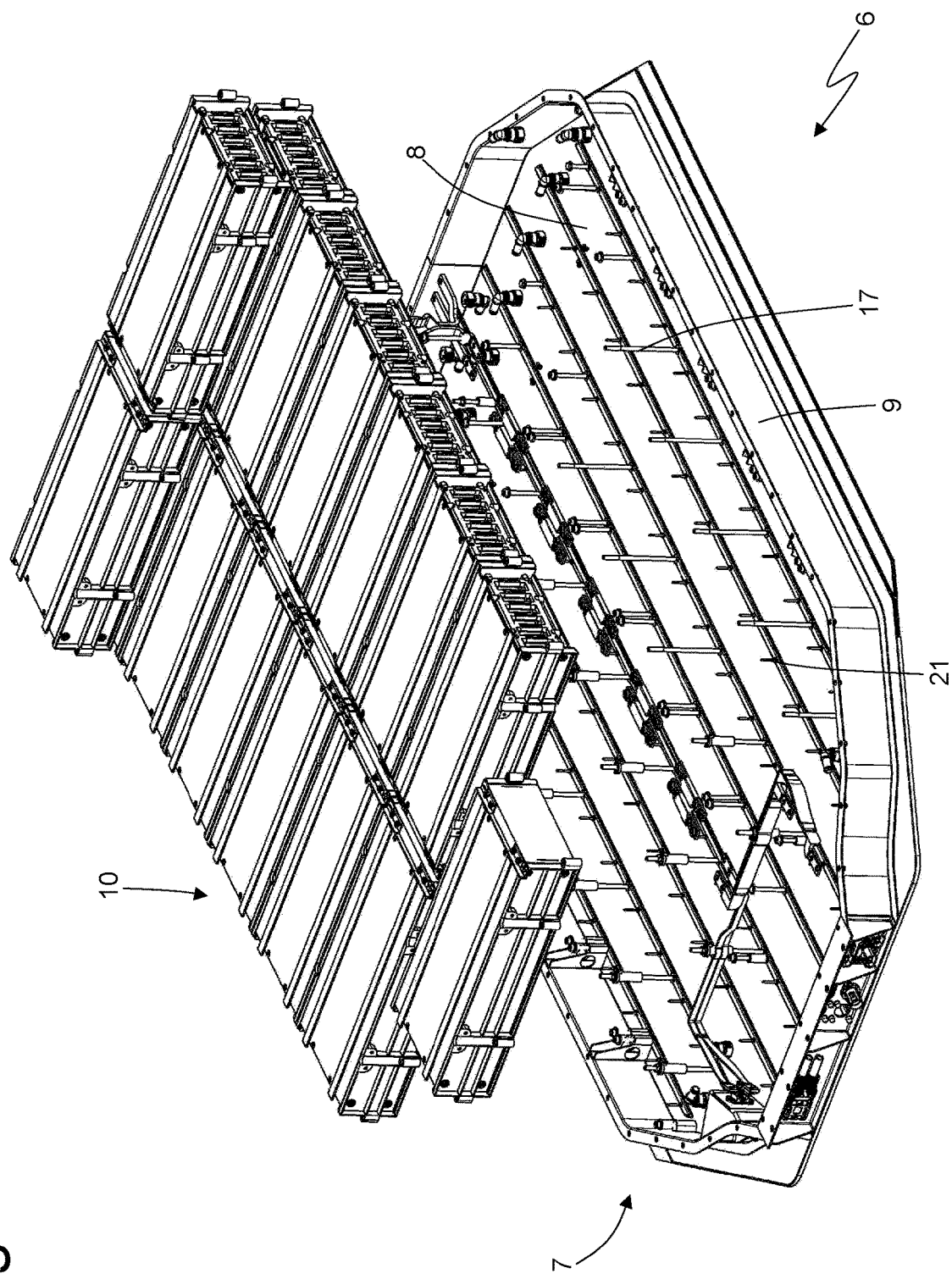
FIG. 2 is an exploded perspective view, with parts removed for clarity, of the power storage system of the vehicle of FIG. 1.

According to what illustrated in FIG. 2, the power storage system 6 has a flat and (relatively) thin shape so as to be integrated inside the floor of the vehicle 1.

The power storage system 6 comprises a container 7 having a lower wall 8 (which constitutes the bottom of the vehicle 1 facing the road surface and is obviously oriented horizontally), an upper wall (not illustrated and oriented horizontally) and a side wall 9 (oriented vertically) which is perpendicular to the lower and upper walls 8 and connects the lower and upper walls 8 to one another.

The power storage system 6 comprises a plurality of modules 10 (in particular fifteen modules 10), each of which is arranged in the container 7, is (initially) separate from and independent of the other modules 10, and houses inside therein a group of electrochemical cells 11 (illustrated in FIG. 4) of parallelepiped shape (i.e. having a pouch structure or a prismatic structure). In a same module 10, the electrochemical cells 11 can be electrically connected to one another only in series or both in series and in parallel. The various modules 10 can be electrically connected to one another in series and/or in parallel.

Figure 3:
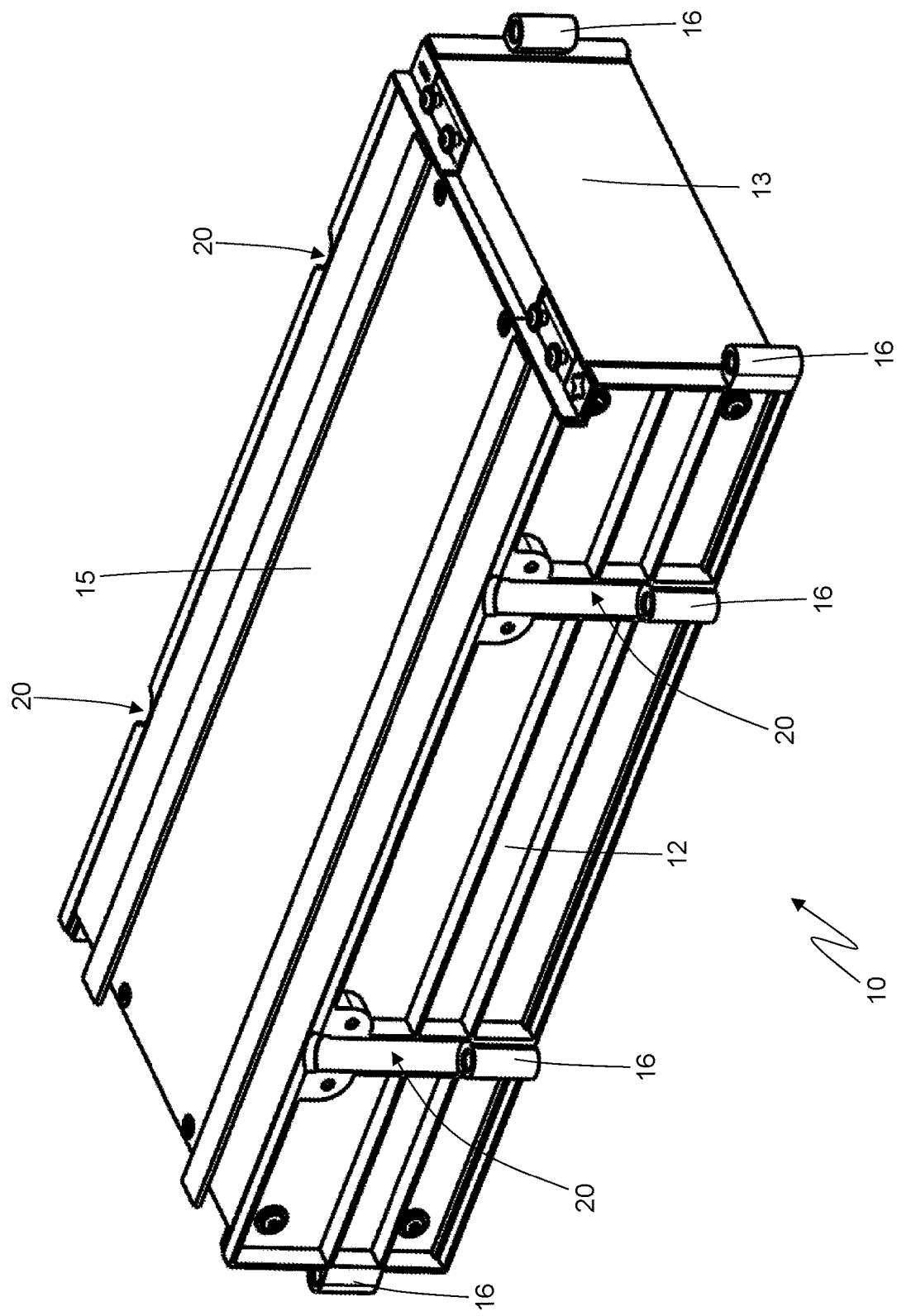
FIG. 3 is a perspective view of a module of the power storage system of FIG. 2.
Figure 4:
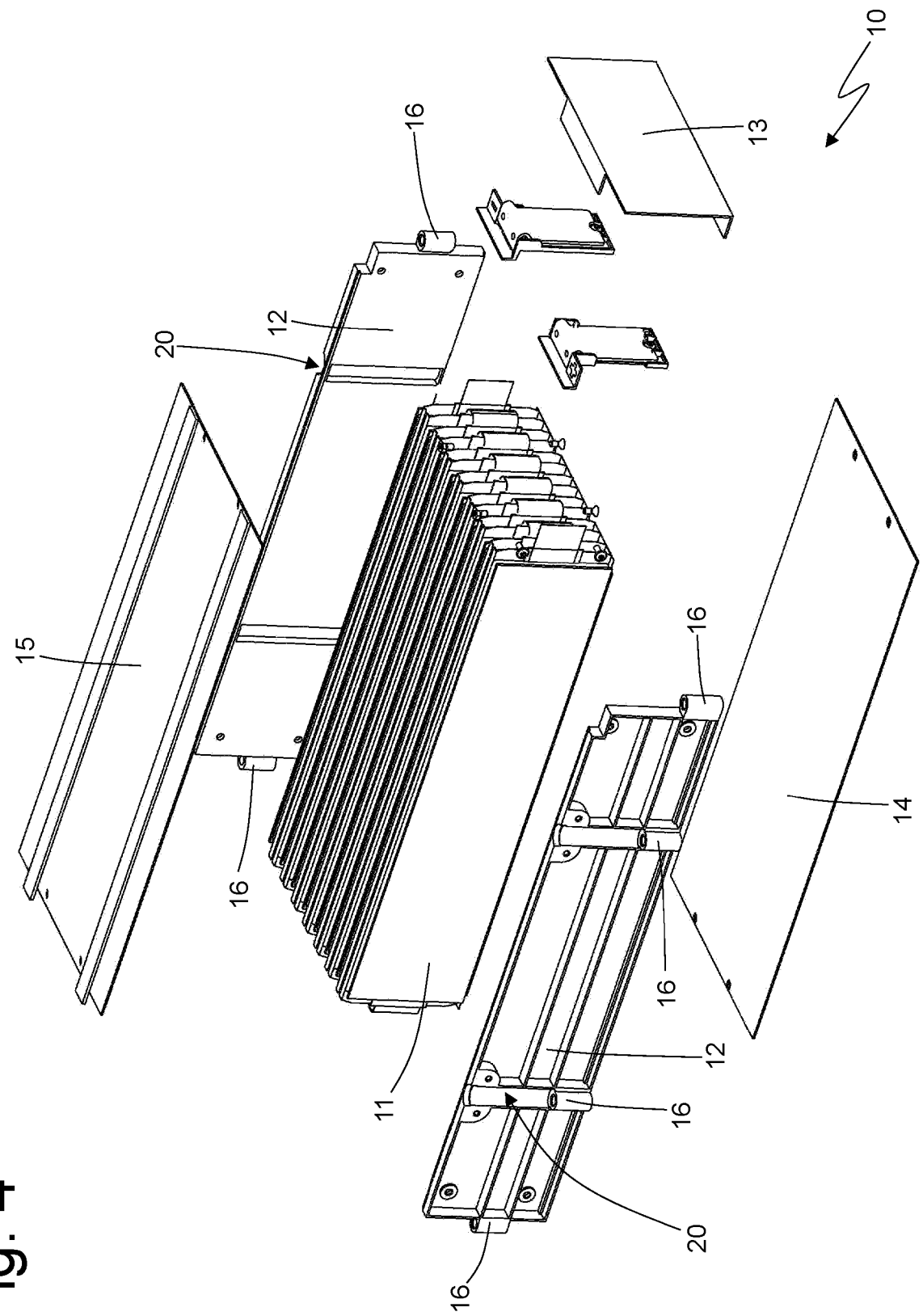
FIG. 4 is a perspective view, with parts removed for clarity, of a module of the power storage system of FIG. 2.

According to what illustrated in FIGS. 3 and 4, each module 10 comprises a group of electrochemical cells 11 of parallelepiped shape which is contained in a dismountable case. Each case comprises two containing walls 12 which are perpendicular to the lower wall 8 of the container 7 and are arranged parallel to one another on opposite sides of the group of electrochemical cells 11 so as to clamp the pack of electrochemical cells 11 between them. Furthermore, each case comprises two head walls 13 which are arranged perpendicularly both to the two containing walls 12 and to the lower wall 8 of the container 7. Lastly, each case comprises a lower wall 14 and an upper wall 15 which are arranged perpendicularly to the two containing walls 12 and are arranged parallel to the lower wall 8 of the container 7; in particular, the lower wall 14 of each case rests on the lower wall 8 of the container 7.

The lower wall 14 and/or the upper wall 15 of each case can comprise a liquid heat exchanger which is used for air-conditioning (i.e. for cooling or for heating) the group of electrochemical cells 11.

In each case, the containing walls 12 are the most mechanically sturdy (resistant) component, i.e. the containing walls 12 have a greater mechanical sturdiness (resistance) than a mechanical sturdiness (resistance) of the head walls 13, of the lower wall 14 and of the upper wall 15. The greater mechanical sturdiness (resistance) of the containing walls 12 is immediately apparent observing FIG. 4: the walls 13-15 are substantially rather thin flat sheets, whereas the containing walls 12 have a greater thickness and also stiffening ribs of relevant dimension.

According to a preferred embodiment, each module 10 comprises tie rods which push the two corresponding containing walls 12 towards one another so as to clamp the group of electrochemical cells 11 between them in a pack manner with a predetermined clamping strength (and necessary for the good operation of the electrochemical cells 11 when the electrochemical cells 11 are of pouch type).

According to a preferred embodiment illustrated in the accompanying figures, the power storage system 6 is configured to be mounted in the vehicle 1 so as to place the containing walls 12 of the modules 10 crosswise relative to a forward direction D of the vehicle 1 (illustrated in FIG. 1); i.e. when the power storage system 6 is mounted in the vehicle 1 all the containing walls 12 of the modules 10 are placed crosswise (i.e. perpendicular to the forward direction D of the vehicle 1).

Each containing wall 12 has a series of tubular connection bodies 16, i.e. a series of connection bodies 16 each having a central through cavity which passes through the connection body 16 from side to side (in other words, the connection bodies 16 are centrally holed). In the preferred embodiment illustrated in the accompanying figures, the connection bodies 16 have a cylindrical shape (thus also their central cavities have a cylindrical shape).

Figure 5:
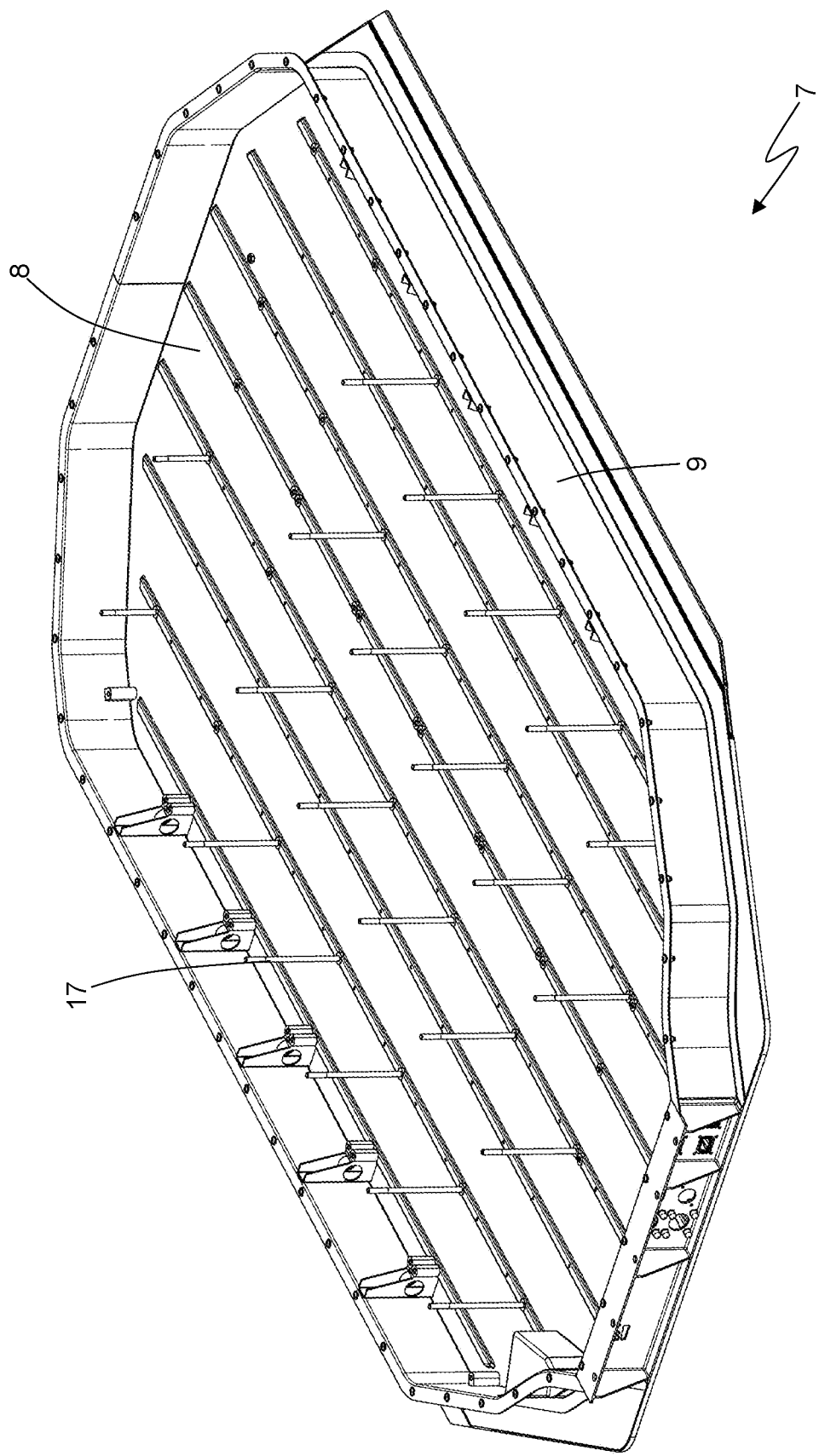
FIG. 5 is a perspective view, with parts removed for clarity, of a container of the power storage system of FIG. 2.
Figure 6:
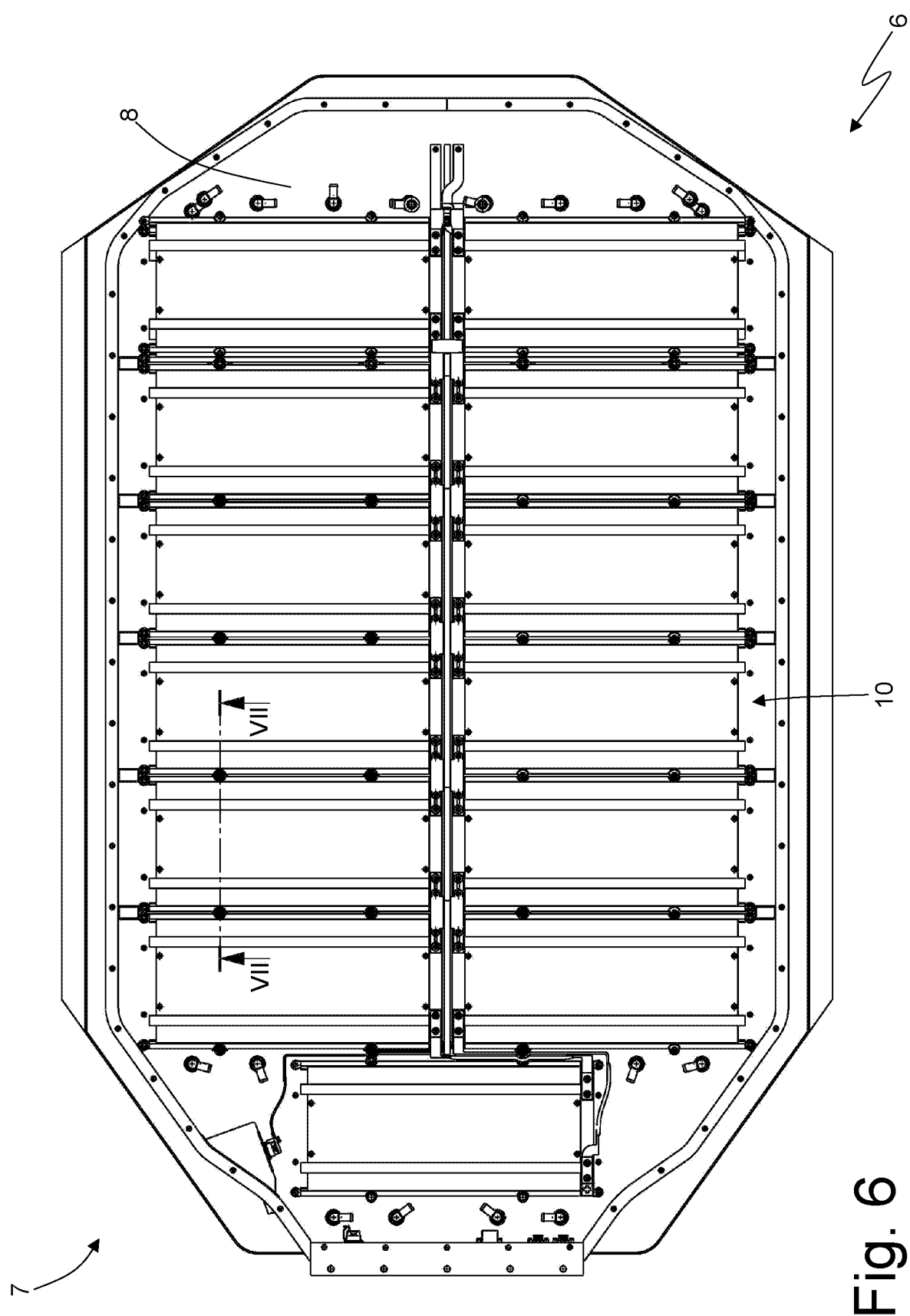
FIG. 6 is a plan view, with parts removed for clarity, of the container of FIG. 5.

According to what illustrated in FIG. 5, the power storage system 6 comprises a plurality of locking elements 17 of cylindrical shape which are fixed to the lower wall 8 of the container 7 and project perpendicularly from the lower wall 8 (thus the locking elements 17 are vertically oriented). The locking elements 17 are configured to engage corresponding connection bodies 16, i.e. to engage the central cavities (without relevant clearance) of the corresponding connection bodies 16.

According to a preferred embodiment, each locking element 17 consists of a stud which has both two ends threaded: a lower end of each locking element 17 is screwed in a blind threaded hole 18 (illustrated in FIG. 7) made through the lower wall 8 of the container 7 whereas an upper end of each locking element 17 is engaged by a nut 19 (illustrated in FIG. 7) which is screwed to a corresponding locking element 17 and is tightened so as to push at least one corresponding connection body 16 towards the lower wall 8 of the container 7 (i.e. to maintain the corresponding module 10 pressed with a given strength against the lower wall 8 of the container 7).

Figure 7:
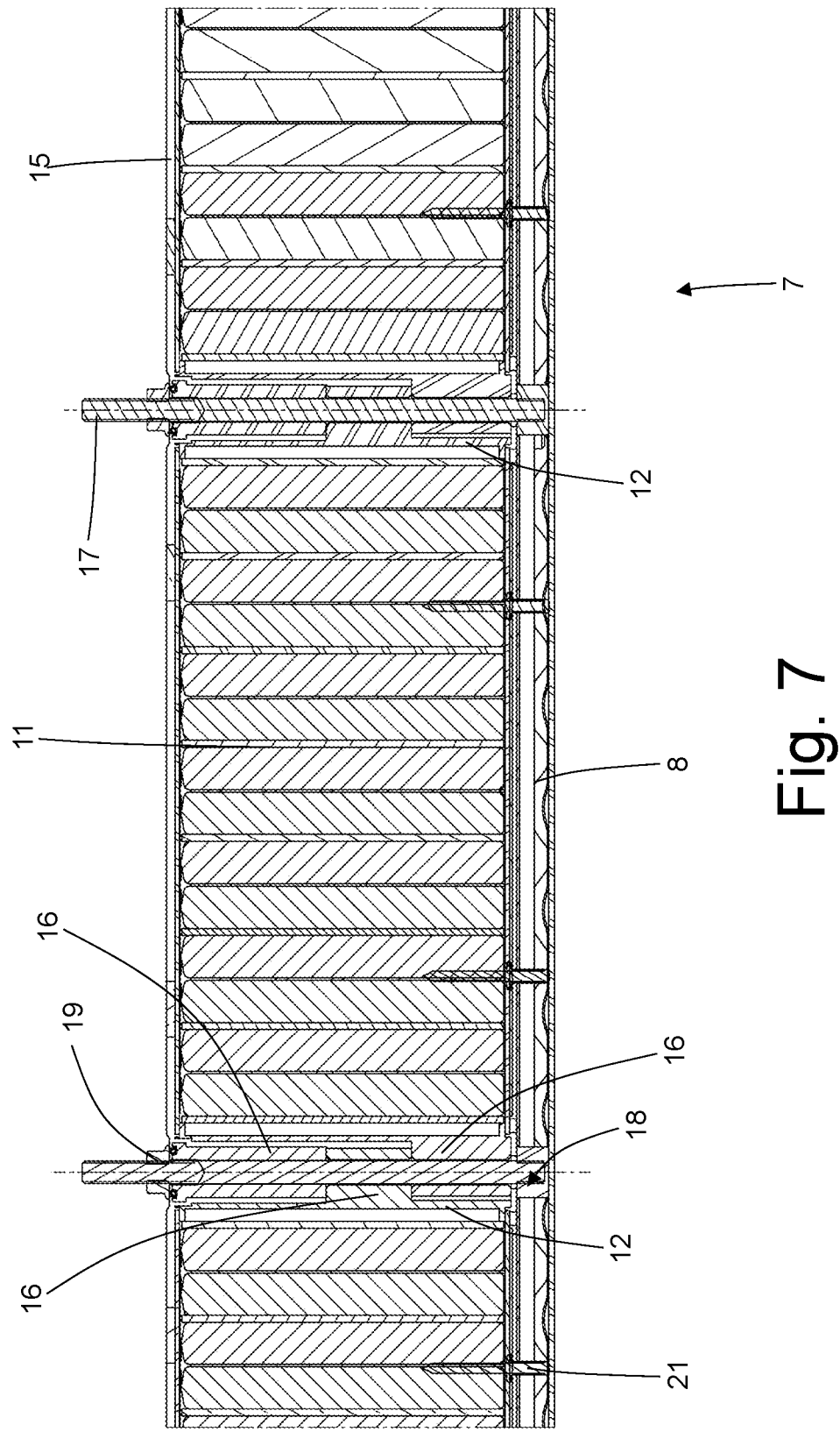
FIG. 7 is a section according to line VII-VII of several modules adjacent to one another of the power storage system of FIG. 2.

According to what illustrated in FIG. 7, the lower wall 8 of the container 7 has reinforcements in the area of the blind threaded holes 18.

According to what illustrated in FIG. 3, each containing wall 12 has several connection bodies 16 which are arranged both in the area of edges of the containing wall 12, and between the edges of the containing wall 12. In particular, in the embodiment illustrated in FIG. 3, each containing wall 12 has two connection bodies 16 arranged (laterally) in the area of the edges of the containing wall 12 and two further connection bodies 16 arranged (centrally) between the edges of the containing wall 12; i.e. in all each containing wall 12 has four connection bodies 16 arranged two (laterally) on the sides of the containing wall 12 and two (centrally) between the edges of the containing wall 12.

According to what illustrated in FIG. 7, two adjacent modules 10 have at least two corresponding connection bodies 16 which are aligned with and overlap one another and are both engaged by a same locking element 17; i.e. a same locking element 17 engages a connection body 16 of a module 10 and also a connection body 16 of another adjacent module 10. Consequently, two connection bodies 16 engaged by a same locking element 17 are arranged in different positions along the locking element 17, i.e. are arranged vertically staggered (being the locking elements 17 arranged vertically) so as to be arranged coaxial to one another.

According to what illustrated in FIG. 3, each containing wall 12 has two recesses 20 which reproduce in negative the shape of a connection body 16 and house a connection body 16 of an adjacent containing wall 12 (as illustrated in FIG. 7) thus creating an interlocking coupling.

In other words, a containing wall 12 has at least one first connection body 16 (actually two in the illustrated embodiment) and at least one first recess 20 which reproduces in negative the shape of a connection body 16 and is coaxial to the first connection body 16, a second containing wall 12 which is adjacent to and rests against the first containing wall 12, has at least one second connection body 16 (actually two in the illustrated embodiment) and at least one second recess 20, which reproduces in negative the shape of a connection body 16 and is coaxial to the second connection body 16; when the power storage system 6 is mounted, each first connection body 16 of the first containing wall 12 engages a corresponding second recess 20 of the second containing wall and, in the same manner, each second connection body 16 of the second containing wall 12 engages the corresponding first recess 20 of the first containing wall 12, thus creating an interlocking coupling (illustrated in FIG. 7). Obviously, as mentioned in the foregoing, a first connection body 16 of the first containing wall 12 is arranged vertically staggered relative to a corresponding second connection body 16 of the second containing wall 12 so that the two connection bodies 16 can be coaxial to one another and thus can be engaged by a same locking element 17.

In other words, each containing wall 12 has for each connection body 16 arranged between the edges of the containing wall 12 a corresponding recess 20 which reproduces in negative the shape of a connection body 16 and is coaxial to the connection body 16.

In FIG. 2, rivets 21 are also visible which are connected to the lower wall 8 of the container 7 and are necessary for the fixing of a sub-base.

The embodiments described herein can be combined with one another without departing from the scope of protection of the present invention.

The power storage system 6 described above has numerous advantages.

Firstly, the power storage system 6 described above allows contributing in a relevant manner to the mechanical resistance and to the sturdiness of the floor of the vehicle 1.

Furthermore, the power storage system 6 described above has a sensible reduction in weight with respect to an analogous known power storage system 6 since inside therein it is completely devoid of stiffening elements (i.e. it is completely devoid of struts and crosspieces).

Finally, the cost and the production complexity of the power storage system 6 described above are relatively reduced.

LIST OF THE REFERENCE NUMERALS OF THE FIGURES 1 vehicle
2 wheels
3 powertrain system
4 electric machine
5 transmission
6 power storage system
7 container
8 lower wall
9 side wall
10 module
11 electrochemical cells
12 containing walls
13 head walls
14 lower wall
15 upper wall
16 connection bodies
17 locking elements
18 threaded hole
19 nut
20 recess
21 rivets
D forward direction

The invention claimed is:

1. A power storage system (6) for a vehicle (1) provided with at least one electric motor (4); the power storage system (6) comprises:
   a container (7) provided with a lower wall (8); and
   a plurality of modules (10), which are housed inside the container (7) and directly rest on the lower wall (8);
   wherein each module (10) comprises a group of electrochemical cells (11) and two containing walls (12), which are perpendicular to the lower wall (8) of the container (7) and are arranged parallel to one another on opposite sides of the group of electrochemical cells (11) so as to clamp the group of electrochemical cells (11) between them;
   wherein each containing wall (12) has at least one tubular connection body (16);
   wherein a plurality of locking elements (17) are provided, which are fixed to the lower wall (8), project perpendicularly from the lower wall (8) and engage the connection bodies (16);
   wherein at least two adjacent modules (10) have two corresponding connection bodies (16) which are aligned with and overlap one another and are both engaged by a same locking element (17); and
   wherein at least one containing wall (12) has a recess (20), which reproduces in negative the shape of a connection body (16) and houses a connection body (16) of an adjacent containing wall (12), thus creating an interlocking coupling.

2. The power storage system (6) according to claim 1, wherein:
   each locking element (17) is at least partially threaded; and
   a plurality of nuts (19) are provided, each screwed to a corresponding locking element (17) and tightened so as to push at least one corresponding connection body (16) towards the lower wall (8) of the container (7).

3. The power storage system (6) according to claim 1, wherein a same locking element (17) engages a connection body (16) of a module (10) and also a connection body (16) of another adjacent module (10) and consequently two connection bodies (16) engaged by a same locking element (17) are arranged in different positions along the locking element (17) and are arranged vertically staggered so as to be arranged coaxial to one another.

4. The power storage system (6) according to claim 1, wherein two connection bodies (16) engaged by a same locking element (17) are arranged in different positions along the locking element (17).

5. The power storage system (6) according to claim 1, wherein:

a first containing wall (12) has at least one first connection body (16) and at least one first recess (20), which reproduces in negative the shape of a connection body (16) and is coaxial to the first connection body (16);

a second containing wall (12), which is adjacent to and rests against the first containing wall (12), has at least one second connection body (16) and at least one second recess (20), which reproduces in negative the shape of a connection body (16) and is coaxial to the second connection body (16);

the first connection body (16) of the first containing wall (12) engages the second recess (20) of the second containing wall (12); and the second connection body (16) of the second containing wall (12) engages the first recess (20) of the first containing wall (12), thus creating an interlocking coupling.

6. The power storage system (6) according to claim 1, wherein:

each locking element (17) is at least partially threaded; and the lower wall (8) of the container (7) has a plurality of threaded holes (18), into which the locking elements (17) are screwed.

7. The power storage system (6) according to claim 1, wherein the locking elements (17) consist of studs.

8. The power storage system (6) according to claim 1, wherein each containing wall (12) has several connection bodies (16), which are arranged both in the area of the edges of the containing wall (12) and between the edges of the containing wall (12).

9. The power storage system (6) according to claim 8, wherein each containing wall (12) has two connection bodies (16), which are arranged in the area of the edges of the containing wall (12), and two further connection bodies (16), which are arranged between the edges of the containing wall (12).

10. The power storage system (6) according to claim 8, wherein each containing wall (12) has, for each connection body (16) arranged between the edges of the containing wall (12), a corresponding recess (20), which reproduces in negative the shape of a connection body (16) and is coaxial to the connection body (16).

11. The power storage system (6) according to claim 1, wherein each module (10) comprises tie rods, which push the two corresponding containing walls (12) of the same module (10) towards one another.

12. The power storage system (6) according to claim 1, wherein each module (10) comprises two head walls (13), which are arranged perpendicularly to the two containing walls (12) and have a smaller mechanical sturdiness than a mechanical sturdiness of the containing walls (12).

13. The power storage system (6) according to claim 1, wherein each module (10) comprises a lower wall (14) and an upper wall (15), which are arranged perpendicularly to the two containing walls (12) and have a smaller mechanical sturdiness than a mechanical sturdiness of the containing walls (12).

14. An electrically propelled vehicle (1) comprising:
four wheels (2);
at least one electric powertrain system (3) comprising at least one reversible electric machine (4); and
a power storage system (6) according to claim 1 and mounted in the vehicle (1) so as to place the containing walls (12) crosswise relative to a forward direction (D) of the vehicle.

15. A power storage system (6) for a vehicle (1) provided with at least one electric motor (4); the power storage system (6) comprises:

a container (7) provided with a lower wall (8); and a plurality of modules (10), which are housed inside the container (7) and directly rest on the lower wall (8);

wherein each module (10) comprises a group of electrochemical cells (11) and two containing walls (12), which are perpendicular to the lower wall (8) of the container (7) and are arranged parallel to one another on opposite sides of the group of electrochemical cells (11) so as to clamp the group of electrochemical cells (11) between them;

wherein each containing wall (12) has at least one tubular connection body (16);

wherein a plurality of locking elements (17) are provided, which are fixed to the lower wall (8), project perpendicularly from the lower wall (8) and engage the connection bodies (16);

wherein at least two adjacent modules (10) have two corresponding connection bodies (16) which are aligned with and overlap one another and are both engaged by a same locking element (17);

wherein a first containing wall (12) has at least one first connection body (16) and at least one first recess (20), which reproduces in negative the shape of a connection body (16) and is coaxial to the first connection body (16);

wherein a second containing wall (12), which is adjacent to and rests against the first containing wall (12), has at least one second connection body (16) and at least one second recess (20), which reproduces in negative the shape of a connection body (16) and is coaxial to the second connection body (16);

wherein the first connection body (16) of the first containing wall (12) engages the second recess (20) of the second containing wall (12); and wherein the second connection body (16) of the second containing wall (12) engages the first recess (20) of the first containing wall (12), thus creating an interlocking coupling.

16. The power storage system (6) according to claim 15, wherein:

each locking element (17) is at least partially threaded; and the lower wall (8) of the container (7) has a plurality of threaded holes (18), into which the locking elements (17) are screwed.

17. The power storage system (6) according to claim 15, wherein each containing wall (12) has several connection bodies (16), which are arranged both in the area of the edges of the containing wall (12) and between the edges of the containing wall (12).

18. The power storage system (6) according to claim 17, wherein each containing wall (12) has, for each connection body (16) arranged between the edges of the containing wall (12), a corresponding recess (20), which reproduces in negative the shape of a connection body (16) and is coaxial to the connection body (16).

19. The power storage system (6) according to claim 15, wherein each module (10) comprises tie rods, which push the two corresponding containing walls (12) of the same module (10) towards one another.

20. An electrically propelled vehicle (1) comprising:
four wheels (2);
at least one electric powertrain system (3) comprising at least one reversible electric machine (4); and a power storage system (6) comprising: a container (7) provided with a lower wall (8);

and a plurality of modules (10), which are housed inside the container (7) and directly rest on the lower wall (8);

wherein each module (10) comprises a group of electrochemical cells (11) and two containing walls (12), which are perpendicular to the lower wall (8) of the container (7) and are arranged parallel to one another on opposite sides of the group of electrochemical cells (11) so as to clamp the group of electrochemical cells (11) between them;

wherein each containing wall (12) has several tubular connection bodies (16), which are arranged both in an area of edges of the containing wall (12) and between the edges of the containing wall (12), and wherein each containing wall (12) has, for each tubular connection body (16) arranged between the edges of the containing wall (12), a corresponding recess (20), which reproduces in negative a shape of the tubular connection body (16) and is coaxial to the tubular connection body (16);

wherein a plurality of locking elements (17) are provided, which are fixed to the lower wall (8), project perpendicularly from the lower wall (8) and engage the connection bodies (16);

wherein at least two adjacent modules (10) have two corresponding connection bodies (16) which are aligned with and overlap one another and are both engaged by a same locking element (17);

wherein each module (10) comprises two head walls (13), which are arranged perpendicularly to the two containing walls (12) and have a smaller mechanical sturdiness than a mechanical sturdiness of the containing walls (12); and wherein the power storage system (6) is mounted in the vehicle (1) so as to place the containing walls (12) crosswise relative to a forward direction (D) of the vehicle.

21. The electrically propelled vehicle (1) according to claim 20, wherein each module (10) comprises a lower wall (14) and an upper wall (15), which are arranged perpendicularly to the two containing walls (12) and have a smaller mechanical sturdiness than a mechanical sturdiness of the containing walls (12).

22. The electrically propelled vehicle (1) according to claim 20, wherein each module (10) comprises tie rods, which push the two corresponding containing walls (12) of the same module (10) towards one another.

23. The electrically propelled vehicle (1) according to claim 20, wherein at least one containing wall (12) has a recess (20), which reproduces in negative the shape of a connection body (16) and houses a connection body (16) of an adjacent containing wall (12), thus creating an interlocking coupling.

24. The electrically propelled vehicle (1) according to claim 20, wherein:

a first containing wall (12) has at least one first connection body (16) and at least one first recess (20), which reproduces in negative the shape of a connection body (16) and is coaxial to the first connection body (16);

a second containing wall (12), which is adjacent to and rests against the first containing wall (12), has at least one second connection body (16) and at least one second recess (20), which reproduces in negative the shape of a connection body (16) and is coaxial to the second connection body (16);

the first connection body (16) of the first containing wall (12) engages the second recess (20) of the second containing wall (12); and the second connection body (16) of the second containing wall (12) engages the first recess (20) of the first containing wall (12), thus creating an interlocking coupling.

\* \* \* \* \*